United States Patent [19]
Lee

[11] Patent Number: 5,445,746
[45] Date of Patent: Aug. 29, 1995

[54] METHOD FOR DEWATERING A POROUS WET WEB

[75] Inventor: Charles A. Lee, Knoxville, Tenn.

[73] Assignee: Cer-Wat Corporation, Knoxville, Tenn.

[21] Appl. No.: 139,541

[22] Filed: Oct. 20, 1993

Related U.S. Application Data

[63] Continuation-in-part of Ser. No. 937,365, Aug. 28, 1992, Pat. No. 5,256,288, and a continuation-in-part of Ser. No. 937,988, Aug. 28, 1992, Pat. No. 5,292,438, and a continuation-in-part of Ser. No. 937,512, Aug. 28, 1992, Pat. No. 5,259,952.

[51] Int. Cl.$^6$ .................................................. B01D 33/04
[52] U.S. Cl. .................................... 210/783; 210/802; 210/808; 210/400; 100/118; 162/204
[58] Field of Search ............... 210/783, 785, 784, 802, 210/808, 386, 400, 406; 100/118, 119, 120; 162/204

[56] References Cited

U.S. PATENT DOCUMENTS

| | | | |
|---|---|---|---|
| 2,756,649 | 7/1956 | Lee | 92/44 |
| 3,150,037 | 9/1964 | Lee | 162/208 |
| 3,214,326 | 10/1965 | Lee | 162/205 |
| 3,224,928 | 12/1965 | Lee et al. | 162/214 |
| 3,528,227 | 9/1970 | Lee et al. | 55/524 |
| 3,645,842 | 2/1972 | Ward | 162/203 |
| 3,919,369 | 11/1975 | Holden | 264/45.1 |
| 4,096,060 | 6/1978 | Lee et al. | 210/23 R |
| 4,137,159 | 1/1979 | Sawyer | 210/19 |
| 4,137,169 | 1/1979 | El-Hindi | 210/97 |
| 4,142,950 | 3/1979 | Creamer et al. | 204/96 |
| 4,285,815 | 8/1981 | Gallottini | 210/400 |
| 4,285,816 | 8/1981 | Lee | 210/401 |
| 4,470,859 | 9/1984 | Benezra | 156/155 |
| 4,556,450 | 12/1985 | Chuang et al. | 162/204 |
| 4,571,359 | 2/1986 | Dutt | 428/240 |
| 4,657,806 | 4/1987 | Dutt | 428/226 |
| 5,008,007 | 4/1991 | Anderson | 210/111 |
| 5,041,222 | 8/1991 | O'Dell | 210/386 |
| 5,089,075 | 2/1992 | Sonoda | 156/244.18 |

FOREIGN PATENT DOCUMENTS 557356 5/1958 Canada.

OTHER PUBLICATIONS

Morrison, R. E., "Felt Capillary Structure and Water Removal", *Pulp and Paper* Magazine of Canada, Feb. 7, 1969, pp. 58–62.

*Primary Examiner*—Robert A. Dawson
*Assistant Examiner*—David Reifsnyder
*Attorney, Agent, or Firm*—Paul E. Hodges

[57] ABSTRACT

A method and apparatus for dewatering a wet web wherein the water is withdrawn from the web via capillary action of the pores of a thin porous membrane component of a bi-component filtration medium and transferred to a plurality of reservoirs defined in a second component of the medium from whence the water is withdrawn and directed to a collector or disposal site.

11 Claims, 4 Drawing Sheets

PRIOR ART

Fig. 6

PRIOR ART

Fig. 7

METHOD FOR DEWATERING A POROUS WET WEB

FIELD OF THE INVENTION

This application is a continuation-in-part of application Ser. No. 07/937,365, filed Aug. 28, 1992, entitled: FILTRATION MEDIUM INCLUDING SUBSTRATE-SUPPORTED POROUS MEMBRANE AND METHOD FOR THE MANUFACTURE THEREOF, now U.S. Pat. No. 5,256,288 and of application Ser. No. 07/937,988, filed Aug. 28, 1992, entitled FILTRATION MEDIUM INCLUDING UNIFORMLY POROUS PLANAR SUBSTRATE AND UNIFORMLY SPACED-APART THERMOPLASTIC RESIN (as amended), now U.S. Pat. No. 5,292,438 and of application Ser. No. 07/937,512, filed Aug. 28, 1992, entitled SYSTEM FOR SEPARATING SOLIDS FROM A LIQUID IN A DIVIDED CHANNEL (as amended), now U.S. Pat. No. 5,259,952 each of the aforesaid applications being incorporated herein in their entirety by reference.

This invention relates to the removal of a liquid or flowable substance from a porous wet web and is specifically useful in removing the liquid from a web which has been formed on a moving conveyor from a slurry of solids carried within the liquid and which has been deposited on the conveyor. One application of the present invention is in the removal of water from a web formed during papermaking. Another application is in the removal of water from a slurry of solid waste.

BACKGROUND OF THE INVENTION

In many applications, a slurry comprising solids suspended in a liquid (i.e., flowable) carrier is deposited on a moving conveyor, such as the forming fabric in a papermaking process or on a filtration belt in a waste filtering process, to form a layer of solids on the conveyor. In the present application this layer of solids is termed a web, but this term is to be deemed to include a layer of particulate solids of any type or kind and which includes interstices which contain a liquid. The solids may be in the form of fibers, such as papermaking fibers or ceramic fibers; in the form of continuous or discontinuous filaments; in the form of particulate solid(s) such as filtered waste; or some combination of these. In all instances related to the present invention, the layer of solids is porous, meaning that the liquid carrier of the slurry from which the layer of solids derived will flow through at least the thickness of the layer of solids. Most commonly, the liquid carrier involved is aqueous, but nonaqueous carriers are known and reference herein to removal of liquid is deemed to include removal of other flowable carrier materials.

Drying is commonly defined as being the removal of a liquid from a material by means of heat. No heat is required in the present invention, however, a layer of solids which has been treated in accordance with the present invention may be subsequently treated with heat to dry the layer of solids. Further, the present invention contemplates the application of heat to the layer of solids in the course of removing the liquid from the layer of solids employing the present invention.

In the prior art, removal of liquid from a web (layer of solids) is commonly accomplished by applying vacuum to one surface of the web, while the web is carried on a porous conveyor, to draw liquid from the web, through the conveyor and to a collector. One variation of this technique is to simultaneously apply a pressure to that surface of the web opposite the conveyor to enhance the movement of the liquid through, and out of, the web, such as through the use of a press roll. A further technique of the prior art is to overlay the upper surface (opposite the conveyor on which the web is supported) with an absorbing web which pulls liquid from the wet web into the more dry overlaid web, that is, a type of blotting effect is accomplished. Other prior art workers have proposed to utilize capillary action to withdraw the liquid from the wet web.

In U.S. Pat. No. 4,556,450 there is disclosed a technique for removing water from a wet web which employs a capillarity effect. In this disclosure, a wet web is overlaid on a segment of a cylinder. The cylinder is provided with a porous cover or, alternatively, is provided with a porous woven fabric, either of which encircles and forms the outer wall of the cylinder. In accordance with the disclosure in this patent, the pores in the cylinder cover (be it a porous cover or a woven fabric cover) are filled with water so that there will be hydraulic communication between the water in the pores of the cylinder cover and the water held in the interstices (pores) of the web. The "effective" diameter of the pores of the cylinder cover are said to be "finer", i.e. smaller, than that of the pores of the web so that there allegedly occurs capillary-type transfer of water from the web into the pores of the cover. In this prior art technique, however, the water which is said to transfer from the web into the pores of the cylinder cover is captured within the pores of the cylinder cover and is not allowed to pass fully through these pores. But rather, the water captured in the pores of the cover is blown by pressurized air reversely through and out of the pores once the pores have ceased to be in hydraulic engagement with the wet web. Because of this limitation of the prior technique, only very small quantities of water may withdrawn from the web via each pore. Further, in this prior technique, it is required that each of the pores in the cylinder cover contain some liquid at all times so as to prevent the flow of air into the cylinder body which results in the expenditure of excess energy in the process. This requirement also requires that the apparatus employed include extensive, hence expensive, vacuum and pressure systems which have very accurate controls, such that any vacuum developed within the cylinder body is not sufficient to draw the water from the pores in the cylinder cover, and that the pressure used to eject a portion of the water from each pore be less than that which will drive all the water from each pore.

In some applications, the economics of the liquid removal process dictate relatively harsh differential pressure conditions. In some applications, these harsh conditions may be tolerated, but in some applications, papermaking and like operations, for example, it is desired that the bulkiness of the web not be reduced materially during the water removal process. This objective can not be met by the prior art water removal techniques which employ merely a differential pressure established across the thickness of the web for the reason that these techniques condense the thickness of the web and destroy its bulk. For example, a tissue web formed of papermaking fibers desirably exhibits a maximum bulk and much effort has been expended in the papermaking industry to achieve such bulk. The present invention provides for the removal of liquid from a wet web economically under conditions ranging from harsh to those conditions where there should be no sacrificing the bulk of the web.

Economic removal of liquid from a wet web has been hindered in the prior art, first, by reason of the difficulty of accommodating the conflicting requirement that rapid withdrawal of liquid from the wet web, which heretofore has been considered to call for the use of relatively open porous conveyors for the web, with the requirement that the withdrawn liquid not be allowed to flow reversely through the pores of the conveyor and back into the web. This problem of the prior art is particularly important where the liquid withdrawal action is caused to take place in the nip between a solid "top" roll and a porous "bottom" roll as the wet web on its conveyor is passed through such nip. In this latter situation, due in part to time constraints, the liquid which is withdrawn from the web can not be carried away from the web conveyor sufficiently fast to prevent accumulation of the withdrawn liquid on the backside of the conveyor where the liquid is in position to reversely flow through the very open pores of the conveyor and reenter the web.

A further problem of the known prior art methods and apparatus for withdrawing liquid from a wet web relates to the difficulty of cleaning the equipment employed in the liquid removal process. For example, the application of a differential pressure across the thickness of a wet web during liquid removal causes fibers or particulates to move from the web and into the pores of the conveyor which is supporting the web or into the pores of any overlaid absorbing web, or the like. Most liquid removal processes must be continuous to be economical so that the web conveyor, added absorbing webs, and the like commonly are continuous loops or porous rolls as referred to hereinabove. This requires that these devices be cleaned of debris which is deposited on and within the pores of the device during the liquid removal phase, so that the device will be suitable for again supporting a fresh portion of the web and removing the liquid therefrom as the process continues. Water jets for spraying water against the moving conveyor, the porous surface of a roll, or similar device, brushes acting on the surfaces of the devices, and like techniques have been used to clean these devices. Each such prior art cleaning technique is less than effective in that eventually the devices plug and must be removed for extensive cleaning or replacement. The present invention avoids the cleaning problem by precluding the deposition or accumulation of debris on the web conveyor or related like devices during the course of removing liquid from a wet web.

It therefore is an object of the present invention to provide a method for the withdrawal of liquid from a wet web.

It is another object of the invention to provide a method for the withdrawal of liquid from a wet web wherein the withdrawn liquid is prevented from reversely flowing back into the web.

It is another object of the invention to provide a method for the withdrawal of liquid from a wet web wherein the bulk of the wet web may be maintained or reduced as desired.

It is another object of the invention to provide apparatus for the withdrawal of liquid from a wet web.

It is another object of the invention to provide apparatus for the withdrawal of liquid from a wet web and which includes means for precluding the reverse flow of the withdrawn liquid back into the web.

Other objects and advantages of the invention will be recognized from the description contained herein including the claims and the drawings in which

SUMMARY OF THE INVENTION

In accordance with the present invention, the inventor provides for the withdrawal of liquid from a wet web employing relatively uncomplicated and inexpensive apparatus and process costs. To this end, a wet web is disposed in overlying relationship with a substantially incompressible filtration medium which includes a substrate layer made up of a woven fabric or the like which has relatively large, interconnected and open interstices between the strands from which the fabric is woven. On one surface of this substrate there is provided a very thin membrane or membrane-like element. This membrane is provided with a very large number of pores, preferably straight-walled, through the thickness thereof, these pores having an average diameter which is less than the average diameter of the pores of the web, preferably a diameter of the membrane pores of less than about 1 micron. This composite of wet web and filtration medium is further disposed in overlying relationship to a source of vacuum, such as a vacuum bed or a porous suction roll. A vacuum is established on that surface of the filtration medium opposite the surface which carries the wet web. Liquid from the wet web initially fills the pores of the membrane component of the filtration medium so that there is hydraulic communication between the liquid in the pores of the web and the liquid in the pores of the membrane component of the filtration medium. Through capillary action, the liquid from the wet web is drawn into the pores of the membrane component of the filtration medium. Liquid drawn from the web via the pores of the membrane further flows into the reservoirs defined in the porous substrate of the filtration medium. The vacuum applied to the reverse side of the filtration medium assists in drawing the liquid fully through the pores of the membrane and into the larger liquid reservoir volume established by the much larger pores in the substrate. Further, the vacuum serves to pull a portion of the liquid from the substrate as the flow thereinto of liquid drawn from the web via the capillary action of the pores of the membrane continues.

Importantly, in the present invention, the filtration medium employed comprises a substrate having relatively large interstices (pores) defined therein which extend fully through the thickness thereof, and a thin porous membrane layer disposed on one surface of the substrate. The pores of the membrane extend fully through the thickness of the membrane and are designed to permit the flow therethrough of that quantity of liquid which is to be withdrawn from the web over a given period of time, but which will block the reverse flow of liquid therethrough in the absence of the aid of externally applied pressure or vacuum. That is, the pores of the membrane are chosen to be of a design such that the energy of the liquid withdrawn from the web and which may be accumulated in the substrate or immediately adjacent the vacuum side of the medium, is insufficient to result in unaided flow of the liquid reversely through the pores of the membrane and back into the web. To this end, the size of the individual pores through the thickness of the membrane is chosen to be smaller than the size of the individual pores or passageways defined by the solid particulates in the web. By this means, the smaller pores through the thickness of the membrane act as "one-way" valves which permit the flow of liquid from the web, via capillary action, through the thickness of the membrane into the interstices of the substrate, and from the substrate, under the influence of the applied vacuum, to a collector or disposal site, but preclude the reverse flow of the liquid through the membrane in the absence of an externally-applied force such as pressure or vacuum.

In accordance with the method of the present invention, there is provided a porous filtration medium for receiving on one surface thereof a web containing a liquid therein. The filtration medium is provided with pores through the thickness thereof which are adequate in size, number and distribution over the surface of the filtration medium to permit the flow of a desired quantity of liquid from the web and through the pores of the filtration medium over a given period of time and under the influence of a selected vacuum applied to that surface of the filtration medium opposite the surface thereof on which the web is disposed, but which are inadequate in size, number and distribution over the surface of the filtration medium as will permit the unaided reverse flow of the withdrawn liquid through the thickness of the filtration medium and reentry to the web, irrespective of the time interval over which the withdrawn liquid is disposed on the aforesaid opposite surface of the filtration medium. The liquid withdrawn from the web is ultimately collected or disposed of.

DETAILED DESCRIPTION OF INVENTION

In the practice of the method of the present invention, there is provided a porous filtration medium for receiving on one surface thereof a web containing a liquid therein. One embodiment of a filtration medium which is suitable for use in the present method is that filtration medium which is described in application Ser. No. 07/937,365, filed Aug. 28, 1992 to which reference is made, now U.S. Pat. No. 5,256,288. Another suitable filtration medium is that which is described in application Ser. No. 07/937,988, filed Aug. 28, 1992, U.S. Pat. No. 5,292,438. Directions for the manufacture of these filtration media are also found in the aforesaid copending applications,, both of which applications are incorporated herein in their entireties.

One filtration medium suitable for use in the present invention, as described in application Ser. No. 07/937,365, filed Aug. 28, 1992, now U.S. Pat. No. 5,256,288 comprises a strong, supportive, porous substrate, preferably woven from a plurality of strands which define knuckles at least on one of the surfaces of the substrate at the crossovers of the woven strands, these knuckles collectively defining a generally flat surface of the substrate. To the knuckles of this surface there is bonded a thin, porous membrane which defines through its thickness a plurality of substantially uniformly sized, and preferentially straight bore, passageways (pores) spaced over the area of the membrane, the membrane being bonded to the substrate, by a plurality of islands of resin that are substantially uniformly spaced over the area between the substrate and the membrane, such islands being preferentially located at the intersections of the strands of the substrate and being of a size and location which does not deleteriously block the permeability of either the membrane or the substrate.

In a preferred method for the manufacture of the present filtration medium, there is provided a woven substrate comprising strands selected to withstand the wear and tear associated with a liquid withdrawal operation and to suitably define between the woven strands interstices which serve as reservoirs for receiving liquid which has been withdrawn from the wet web via the capillary action of the pores of the membrane, as passageways through which liquid can pass from the vicinity of the membrane through the thickness of the substrate and on to a collection or disposal site, in the course of the withdrawal of liquid from a wet web, and as a liquid "seal" between the source of vacuum and the membrane layer of the medium. Selected particulates of a thermoplastic resin are overlaid in a uniform layer onto the substrate. The size of the individual resin particulates is chosen such that these particulates do not readily, and preferably none at all, will pass through the interstices between the strands of the substrate. These resin particulates also are larger in size that the diametral dimension of the pores of the porous membrane so that they will not enter and block these pores. Additionally, the size of the resin particulates is not to be greater than required to effect spaced apart islander bonding locations between the strands of the substrate and the porous membrane. After the layer of resin particulates is applied to one of the flat surfaces of the substrate, a thin porous membrane is overlaid onto the layer of particulates, and preferably lightly pressed into intimate engagement with such layer. A second woven web, which preferably is substantially like the woven substrate, is overlaid on the membrane in covering relationship thereto. The combination of substrate, resin, membrane and overlying web is thereafter heated by means of heat applied only from that side of the substrate which is free of the particulate layer, whereupon the resin particulates are caused to be heated to at least their glass transition temperature and, whereupon the resin particulates melt and flow preferentially to the intersections of the strands of the substrate to develop islands of resin disposed between the substrate and the overlying porous membrane. Upon cooling below their glass transition temperature, the islands of resin solidify and, at their spaced apart locations, bond to the strands of the substrate, and bond to the inwardly-facing surface of the porous membrane to secure the membrane to the substrate and thereby develop an integrated composite. The heated resin does not adversely block the permeability of either the porous membrane or of the substrate. But rather, through the selection of the manufacturing parameters, e.g. temperature and duration of heating, and the choice of particulates, both as to size and other physical characteristics such as their response to heating, among other things, the particulate layer can be made to function as an excellent bond between the membrane and the substrate while simultaneously not adversely affecting the permeability of the composite filtration medium. After cooling of the composite, the overlying second woven web is removed.

Figure 1:
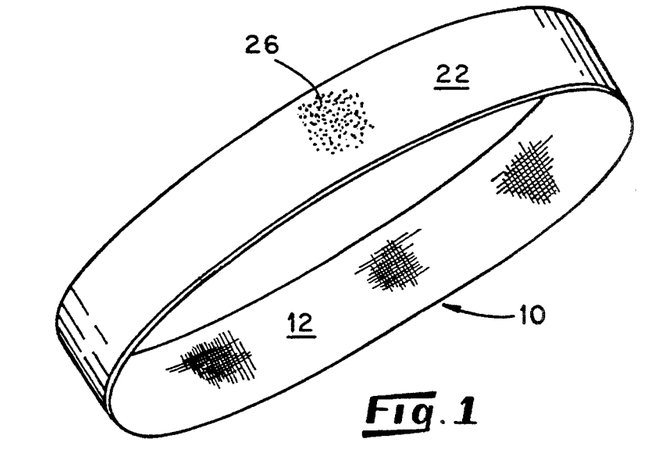
FIG. 1 is a schematic representation of one embodiment of a continuous loop belt filtration medium suitable for use in the present invention.
Figure 2:
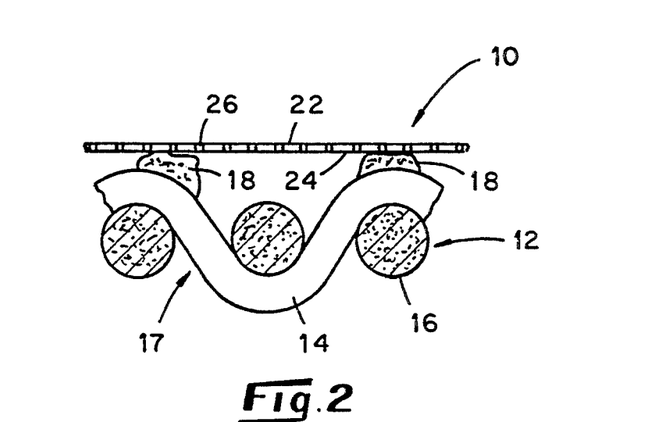
FIG. 2 is a schematic representation, in section, of the filtration medium of FIG. 1 at an intermediate stage in the manufacture of the filtration medium.
Figure 3:
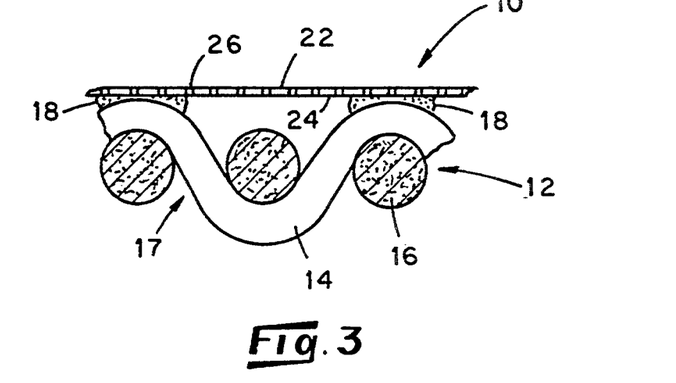
FIG. 3 is a schematic representation, in section, of the completed filtration medium of FIG. 1.

With reference to the Figures, in a preferred embodiment, the filtration medium 10 of the present invention comprises a substrate 112 woven from a plurality of warp yarns 14 and weft yarns 16 which define therebetween a plurality of interstices 17. The weave pattern depicted in FIGS. 2 and 3 is of the square type, but it is anticipated that any of several weave patterns may be employed in the formation of the substrate, such as for example, the complex weave patterns that are commonly employed in the manufacture of forming fabrics for papermaking machines and the like. In any event, the substrate must be of a construction and of materials which will provide the required physical support properties for the filtration medium as are necessary for a particular combination of solids and liquid in a wet web and which defines open interconneted reservoirs that provide passageways through its thickness which can serve as the basis upon which modification may be imposed by means of the application thereon of one or more layers of disparate materials. In one acceptable embodiment, the individual yarns 14 and 16 are of a polyester. The respective diametral dimensions of the warp and weft yarns may vary widely. Complex weave patterns may be employed as desired. In this latter instance, it is common to employ yarns of different diameters for the warp and weft yarns. These weaves may have, for example, 54×88 (CD×MD) mesh, or 77×77 mesh combined with a layer of 39×38 mesh and similar weaves.

The woven substrate functions as a support for the porous membrane. Accordingly, the substrate may be made strong by choosing from any of a large number of weave patterns, by choosing relatively large strands for use in weaving the substrate, and by choosing strands of any material which is compatible with the components of the wet web and the operating parameters of the liquid withdrawal process such as pressure, temperature and chemical composition of the components of the web. This provides a large measure of choices in the construction of the substrate and permits those choices to be in large part selected on the basis of economics.

In one embodiment of the composite filtration medium, the substrate 10 is composited with an overlying porous membrane 22. Suitable membranes include those which possess resistance to attack by the anticipated materials to be separated and which provide passageways (pores) 26 through the thickness thereof that will permit the preferential passage of liquid therethrough to the exclusion of the solids component of the wet web.

Uniformity of pore size, "straight through" passageways (pores) as opposed to tortuous passageways, and low cost are also desirable characteristics of the selected porous membrane. One suitable porous membrane is a polycarbonate membrane such as that sold by Poretics Corporation of Livermore, Calif., under the trade name PCTE membranes and identified as Poretics' polycarbonate Track-Etch membrane filters. This membrane is available with any of a relatively large variety of overall porosities, and including individual pore sizes ranging from pores having an average diameter of about 0.01 micron to about 1 micron, thicknesses of between about 6 and about 10 microns, pore densities of between about $6 \times 10^8$ to about $1 \times 10^5$ pores/cm$^2$, and water flow rates of between <0.1 to about 4,000 ml/min/cm$^2$. A preferred membrane is of a thickness of about 10 microns.

Inasmuch as the membrane of the preferred composite filtration medium is fully supported by the strong substrate, the membrane may be, and preferentially is, very thin, being typically about 10 microns in thickness. This composite is substantially incompressible under strong applied vacuum or press-roll type pressures such as may be encountered in a water removal system as contemplated by the present invention. Specifically, the present filtration medium retains its geometry and integrity when subjected to a vacuum in excess of 27 inches of Hg or applied pressures in excess of several hundred pounds per lineal inch of the medium, such as the pressures commonly encountered with press rolls and like devices. Under such operating conditions, the membrane remains taut and flat on the surface of the substrate, thereby maintaining the pores of the membrane open and enabling the composite filtration medium to withstand the pressures encountered. As noted, the average pore size of the pores of the membrane is smaller than the average pore size of the pores of the wet web.

The combination of a woven substrate, and porous membrane provides for retention of the solids component of the web on the outermost surface of the medium and not within the pores of the medium. This mechanism reduces the tendency of the medium to clog due to the capture of solids in the pores of the membrane, and because any solids which might pass through the membrane layer of the medium are materially smaller than the "pores" through the thickness of the substrate layer of the medium, there is no capture of these solids by the medium, hence there is no plugging of the medium. By this means, the filtration medium of the present invention reduces the likelihood of debris collecting on the surface of the medium and permits ready removal of any debris which may be carried forward on the surface of the medium when the web is removed from the medium. Relatively light water sprays or brushing of the surface of the medium normally is satisfactory for cleaning any such debris from the medium.

As noted, in accordance with the present invention, the selected filtration medium is a composite of a substrate and a thin membrane which is bonded to one surface of the substrate. The membrane possesses pores dispersed over the area thereof, these pores extending through the thickness of the membrane, and preferably being substantially straight-walled. In order for these pores to function as "one-way valves" for the conveyance of liquid from the wet web and preclude the unaided reverse flow of liquid through the filtration medium and into the web, these pores are chosen to be smaller in average diameter than the average diameter of the pores or passageways in the web and which contain the liquid component of the wet web. These pores through the thickness of the membrane, however, are adequate in size, number and/or distribution over the area of the membrane as will permit the flow therethrough of liquid from the wet web via capillary action This selected size of the pores of the membrane, on the other hand, is such that the liquid which has been withdrawn from the web and is accumulated in the pores of the substrate and/or on that side of the filtration medium opposite the supported web, the energy of the liquid is inadequate to result in unaided reverse flow of the liquid from or through the relatively smaller pores of the membrane and back into the web, which, having been depleted of liquid, is prone to accept the liquid. By "unaided", it is meant that the liquid in the pores of the membrane, or in the pores of the substrate, and/or liquid accumulated on that side of the filtration medium opposite the supported web will not flow reversely through the pores of the membrane, hence reversely through the thickness of the filtration medium, and reenter the web unless there is applied to the liquid an external force such as a vacuum applied to the web side of the filtration medium (i.e. applied through the web and to the medium), or a pressure applied to the liquid from that side of the filtration medium opposite the supported web. Whereas it is not known with certainty just what sources of energy are available to the liquid as would tend to cause the liquid to flow reversely through the filtration medium, it is known that when the average pore size of the pores in the membrane are smaller than the pores and/or passageways in the web, and in the absence of externally applied forces, the pores of the membrane will preclude the reverse flow of the liquid to the web. Presumably, this relationship of pore sizes and the "back flow" blocking action of the smaller pores of the membrane is associated to a large degree at least, with naturally occurring forces associated with the liquid, such as the viscosity of the liquid, physical and/or chemical attractions between the liquid and the material of construction of the filtration medium, surface tension of the liquid and/or other forces which affect the movement of the liquid via capillary action. Irrespective of what forces may be present and active with respect to the liquid and/or the filtration medium, the present inventor has found that so long as one selects an average pore size for the pores of the membrane which is less than the average pore size of the pores and/or passageways of the web, there is provided the hereindescribed reverse flow blocking effect by the pores of the membrane.

One consideration in selecting the average pore size for the membrane is that of assuring that there is adequate openness of the membrane as will allow the flow through the thickness of the membrane of that volume of liquid which is intended to be withdrawn from the wet web over the period of time during which the liquid in the wet web is in hydraulic communication with pores of the membrane. This consideration may be satisfied by calculating or estimating the volume of liquid desired to be withdrawn from the web, determining the time period during which a unit area of the web/medium composite will be in the stated hydaulic communication, and thereafter selecting the number of pores of an average size that is less than the average size of the pores in the web (i.e. determining the openness of the membrane having pores of the selected size), which will permit the flow therethrough of the anticipated volume of liquid from the web during the determined time period of hydraulic communication therebetween. The volume of liquid contained in a given web will be a function of the "void volume" established within the web by the pores of the web and the degree to which this void volume is filled with liquid. This void volume is a function of certain physical properties of the web, such as the size and the packed and/or packing density of the solids of the web, and/or other properties which define the size, hence volume,, of the pores within the web. Accordingly, each type of web must be evaluated for void volume. For present purposes, this determination of void volume may be an estimate, but the maximum efficiency of the present method will be realized if the volume of liquid contained within a unit volume of the web is accurately determined, as by laboratory testing of the web.

A further consideration in selecting the pore size of the membrane is to determine the average pore size of the pores of the web. Thereafter, the average pore size selected for the membrane will be smaller than the average pore size of the web pores. This relationship of the average pore sizes of the membrane and web is critical to the present invention in that the smaller pore sizes of the membrane must be sufficiently smaller than the average size of the pores of the web as will cause the pores of the medium to preclude the unaided reverse flow of liquid through the membrane to the web. In general, the ratio of the average pore size of the pores through the membrane to the average pore size of the pores of the web is greater than about 1:1.1. As this ratio increases, for a given web/membrane combination, the volume of liquid withdrawn from the web under given conditions of time will increase if the number of pores through the thickness of the membrane is increased, i.e., the openness of the porous membrane is increased. Further, as this ratio increases, the effectiveness of the pores of the membrane in precluding unaided reverse flow of the liquid to the web, increases to a point. It will be recognized that once the ratio reaches that minimum value where the pores of the membrane initially achieve their flow-blocking abilities, there is no gain to be had in further increasing the ratio, as respects this flow-blocking function of these pores. However, increasing the openness of the membrane, with or without increasing the ratio, does increase the permissible rate of liquid withdrawal so that increased openness of the membrane alone or in combination with a greater difference between the average sizes of the pores of the web and of the membrane may be beneficial from the standpoint of the volume of liquid withdrawn, even though there is no material enhancement of the flow-blocking function of the pores of the membrane by reason of the increased ratio.

Preferably, the liquid withdrawn from the wet web is conducted to a collector or disposal site. In the present invention, there is no critical requirement that the withdrawn liquid be conveyed immediately away from the filtration medium, but rather, the unaided reverse flow blocking function of the membrane precludes the flow of the withdrawn liquid back to the web irrespective of the length of time that the withdrawn liquid is present in fluid communication with the pores of the membrane. This feature of the invention permits the use of less expensive liquid collecting and disposal methods and apparatus.

In the present invention, contrary to the prior art, the interstices of the substrate serve as interconnected reservoirs which collect liquid withdrawn from the web via the capillary action of tile pores of the membrane. This collection of liquid within the substrate serves as a liquid seal between the vacuum which is employed to convey away liquid from the substrate and the membrane and overlying web. By this means, at all times only liquid is being withdrawn from the web, not ambient air. This feature provides substantial savings in the energy required to effect the desired liquid removal. Further, the presence of the reservoirs which are large in volume relative to the volume of the pores of the membrane, and most commonly large relative to the pores of the web, provides paths for the ready and substantially uniform movement of liquid from the substrate-side of the membrane pores so that there is enhanced capillarity action of the membrane pores, hence more efficient withdrawal of liquid from the web over a given period of time.

In one alternative embodiment of the invention, the wet web is disposed flat on one surface of a porous filtration medium, preferably a belt of continuous loop configuration. A second, and preferably like, filtration medium is disposed on that flat surface of the wet web opposite the first filtration medium. By this means, the wet web is captured between the two filtration media. In this configuration, the liquid within the wet web is withdrawn from the web via capillary action by each of the filtration media as described hereinbefore. Alternately, vacuum is applied to first one side of the composite and then to the opposite side of the composite to effect alternating direction of conveyance of the withdrawn liquid away from the filtration media. This alternating of the direction of application of withdrawal of the liquid from the web which is captured between the filtration media is repeated until the web has reached the desired degree of dryness. By reason of this alternating of the liquid withdrawal action, the web is subjected to opposing forces alternatingly so that the solid components of the web are first subjected to forces acting in one direction through the thickness of the web and then to forces acting in an opposite direction through the thickness of the web with the result that the bulk of the web is not materially reduced in the course of the removal of the liquid.

In a further embodiment of the invention, the wet web is disposed flat on one surface of a porous filtration medium and a solid, i.e. nonporous, medium is disposed on that surface of the web which is opposite the porous filtration medium. In this embodiment, there is reduced tendency for the flow of air into and through the thickness of the web as the liquid is withdrawn from the web so that essentially only liquid is withdrawn from the web and through the porous filtration medium.

In a still further embodiment of the invention, the wet web is disposed flat on one surface of a porous filtration medium and the web and filtration medium are passed through the nip of a set of press rolls. Commonly, one of these rolls has a nonporous surface and the second roll has a porous surface. A vacuum is applied to the reveerse side of the filtration medium, with the withdrawn liquid being conveyed away through the second roll. Optionally, these press rolls may be of the "extended nip" type which is well known in the papermaking art.

Figure 4:
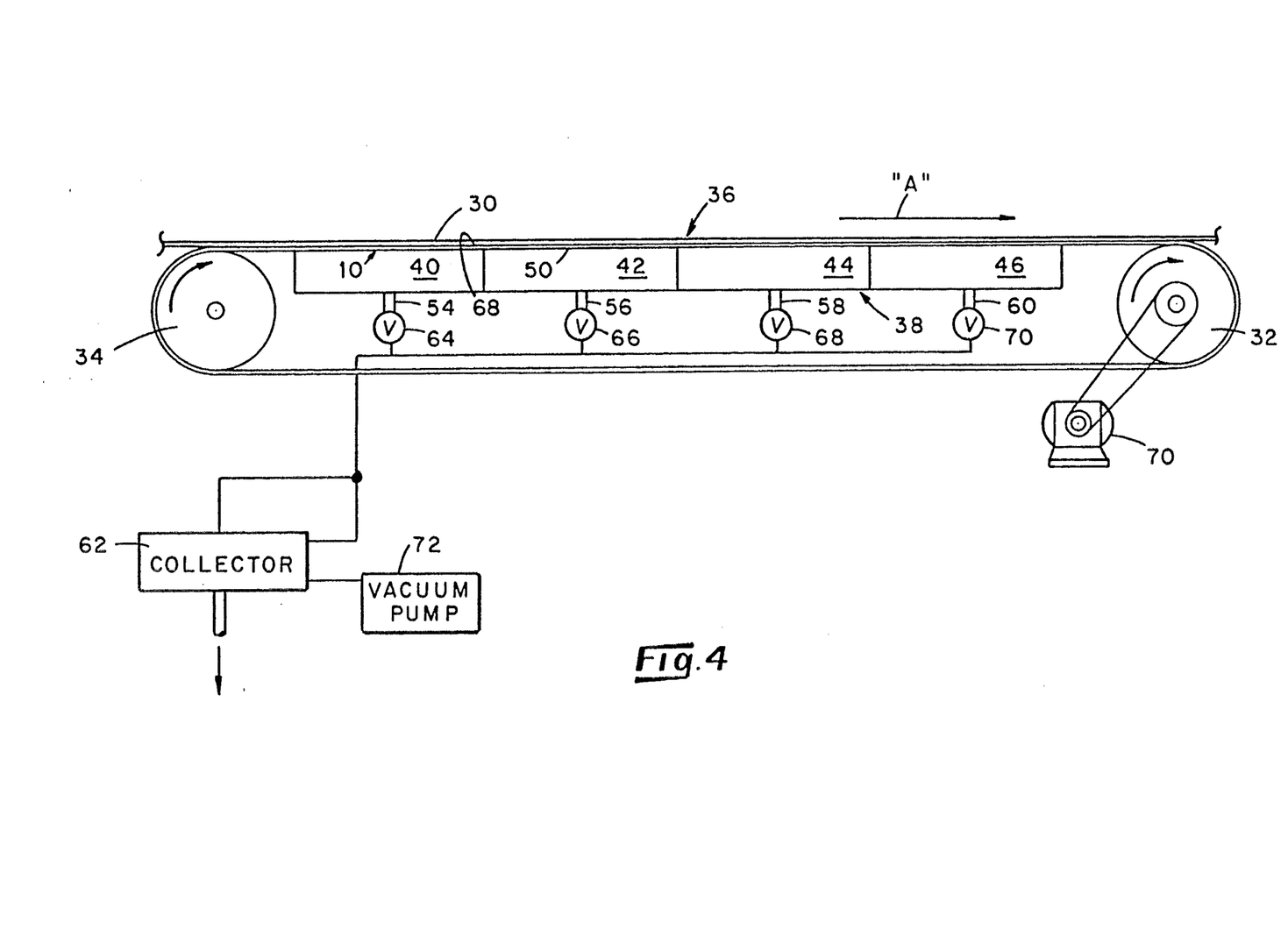
FIG. 4 is a schematic representation of one embodiment of apparatus for use in the withdrawal of liquid from a wet web and depicting various features of the present invention.

With reference to FIG. 4, there is a depicted on embodiment of an apparatus for withdrawing liquid from a wet web 30 disposed in flat overlying relationship to a filtration medium 10. The depicted filtration medium is in the form of a continuous loop belt which is trained about a drive roll 32, thence about guide a roll 34. Between the drive roll 32 and the guide roll 34, the medium defines a run 36 which receives the wet web.

Figure 5:
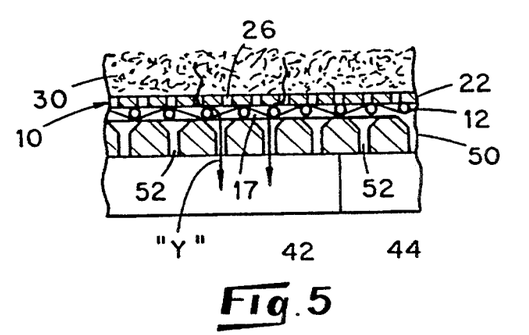
FIG. 5 is a schematic representation, in section, taken generall along line 5—5 of FIG. 4 and depicting the liquid flow path through a web/filtration medium combination of the present invention.

As depicted in FIGS. 4 and 5, the filtration medium during the run 36 overlies a vacuum table, indicated generally by the numeral 38, which comprises a series of vacuum boxes 41, 44, 46, and 48 whose collective upper surfaces are in fluid communication with a planar cover member 50 for the vacuum boxes and which is provided with a plurality of openings 52 through the thickness thereof which are suitable for the flow of liquid from the supported filtration medium to the vacuum boxes.

The several vacuum boxes 42, 44, 46 and 48 are provided with conduits 54, 56, 58 and 60 which provide fluid communication between the boxes and a source of vacuum 62. Valves 64, 66, 68 and 70 interposed along the length of each of these conduits provide for control over the development of vacuum conditions within the vacuum boxes. In the depicted embodiment, liquid collected at the vacuum source 62 may be conveyed away from the collector via a further drain line 66.

In the operation of the apparatus depicted in FIG. 4, the wet web 30 is disposed on the upper surface 68 of the filtration medium 10, which in turn, is disposed in sliding supported relationship with the perforated planar cover member 50. By this means, there are established a plurality of flow paths for the movement of liquid from the wet web, through the filtration medium and into the vacuum boxes from which the liquid may be conveyed away to the collector (vacuum source) 62. Actuation of a drive motor 70 which is connected in driving relationship to the drive roll 32 serves to move the filtration medium forwardly in the direction indicated by the arrow "A". A vacuum is developed in each of the vacuum boxes by means of the vacuum pump 72 acting through the collector 62.

Importantly, the membrane layer 22 (see FIG. 5) of the filtration medium 10 is disposed next to the wet web 30 thereby positioning the substrate layer of the filtration member in sliding engagement with the planar perforated cover 50 of the vacuum boxes. By this means, the liquid within the pores of the wet web is in fluid flow communication with the pores of the membrane layer so that this liquid is drawn, via capillary action, from the wet web and into the pores of the membrane. Since the pores of the membrane are in fluid flow communication with the interstices (pores) of the substrate which in turn are in fluid flow communication with the vacuum boxes. Under the influence of the vacuum, liquid withdrawn from the wet web by the pores of the medium accumulates within the reservoirs defined by the interstices between the strands of the substrate. This accumulated liquid is withdrawn from the reservoirs by the vacuum exerted by the vacuum boxes. The rate of liquid withdrawal from the reservoirs of the substrate is selected to be substantially equal to, or slightly less than, the rate at which the pores of the membrane draw liquid from the web. In this manner, there is maintained at all times sufficient liquid within the pores of the membrane and within the reservoirs of the substrate as will provide a liquid seal between the source of vacuum and the membrane layer. Accordingly, at no time after commencement of the flow of liquid from the wet web is there an opportunity for ambient air to be drawn into and through the web and filtration medium, thereby conserving energy of operation of the apparatus. Whereas FIG. 4 does not depict such, the side edges of the web and/or the filtration medium are sealed as by means of side walls provided on the opposite side edges of the web and/or filtration medium as will be recognized by one skilled in the art.

Figure 6:
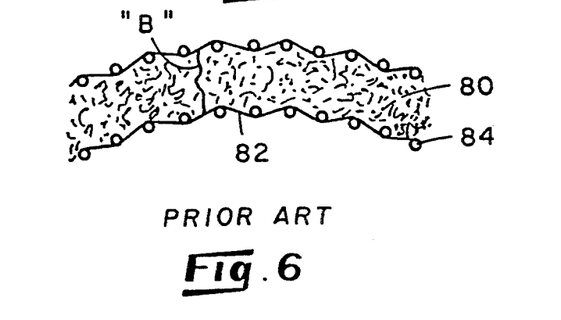
FIG. 6 is a schematic representation of one embodiment of a water removal apparatus as taught in the prior art.
Figure 7:
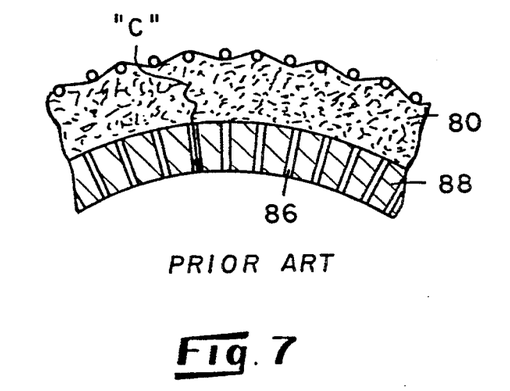
FIG. 7 is a schematic representation of a further embodiment of the prior art water removal apparatus depicted in FIG. 6.

FIG. 5 depicts schematically a section through the thickness of the web 30, filtration medium 10, the cover 50, and a portion of the vacuum boxes 42 and 44. In this FIG. 5, the flow path of liquid from the wet web, through the pores 26 of the membrane layer 22, thence through the reservoirs 17 of the substrate 12, and through the through openings 52 of the cover 50 is depicted by the arrows "Y". It is to be noted that this flow path is not reversed at any point. This feature of the present invention is to be contrasted with the prior art depicted in FIGS. 6 and 7, which is representative of the disclosure of U.S. Pat. No. 4,556,450, wherein liquid contained within a wet web 80 is drawn from the web into a plurality of pores such as the pores 82 defined by the interstices between the strands of a woven fabric 84 or into the pores 86 in a porous cover 88 of a cylinder. Arrows "B" and "C" of FIGS. 6 and 7, respectively, depict the liquid flow paths of each of the depicted embodiments of the prior art technique. In this prior art technique, the liquid does not flow through the pores, but rather, after the pores have moved away from hydraulic communication with the liquid in the web, pressure is exerted to blow a portion of the liquid reversely out of each pore. Thus, the volume of liquid which can be withdrawn from the web over a given period of time is limited to the aggregate volume of the pores which are in hydraulic communication with the web over such period of time. Also importantly, there is required very careful control over the application of the pressure employed to eject liquid from the pores, in that too much pressure will remove all the liquid from the pores and open the pores to receive air which must be withdrawn from the pores before they can again draw liquid from the web.

Figure 8:
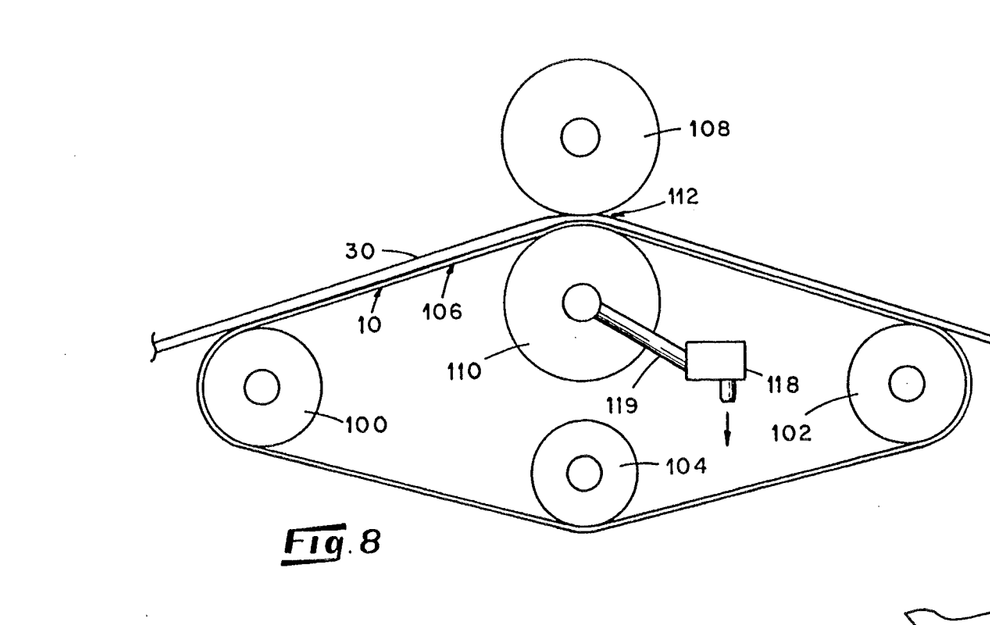
FIG. 8 is a schematic representation of a further embodiment of apparatus for use in the withdrawal of liquid from a wet web and depicting various features of the present invention.
Figure 9:
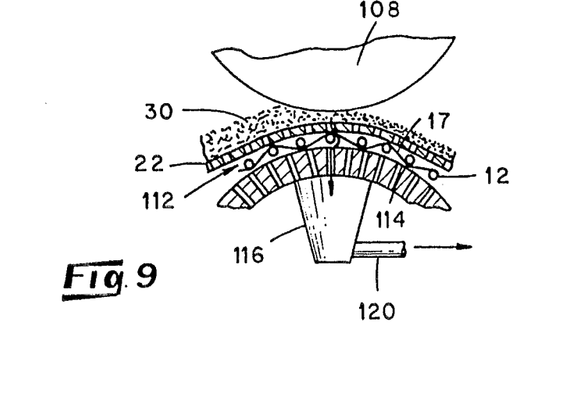
FIG. 9 is a schematic representation, in section, taken along line 9—9 of FIG. 8 and depicting a portion of the nip region of the press rolls depicted in FIG. 8.

In FIGS. 8 and 9, there is depicted a further embodiment of apparatus embodying various features of the present invention and includes a filtration medium 10 of the continuous loop belt configuration which is trained about a drive roll 100 and guide rolls 102 and 104. A run 106 of the filtration medium is defined between the drive roll 100 and the guide roll 102 and receives thereon a wet web. Within this run, there is provided a set of press rolls 108 and 110, the first of which 108 is disposed on the upper side of the filtration medium and the other of which 110 is disposed on the lower side of the filtration medium. These rolls define therebetween a pressure nip 112 through which the filtration medium and its overlying wet web pass. In this embodiment, the lower roll 110 is hollow and includes a porous outer shell 114 (see FIG. 9). Internally, the roll 110 is provided with a stationary vacuum chamber 116 which is in fluid communication with the inner surface of the porous shell of the roll. A vacuum is developed within the chamber 116 as by means of a vacuum pump 118 which is connected in fluid communication with the vacuum chamber 116 by a conduit 119. As the wet web on the filtration medium pass through the nip 112, pressure is exerted against the web and medium in the direction of the thickness of the web. This pressure condenses the thickness of the web and urges liquid in the pores of the web toward the filtration medium where the pores in the membrane layer 22 of the filtration medium enter into fluid communication with such liquid and draw the same into the reservoirs 17 of the substrate 12 of the filtration medium 10. From these reservoirs, the liquid is drawn by the vacuum applied from the interior of the roll and through its porous shell, into the vacuum chamber 116 from whence it is dispensed through a conduit 120 to a collector or disposal site.

In a series of operations embodying the method and apparatus of the present invention, a filtration medium comprising a substrate layer made up of polyester strands woven in a two-layered weave pattern which included a 70×70 fine mesh top layer and a 39×35 coarse mesh bottom layer and designated Design 890, Tri-Ply Fabric, by Wisconsin Wire of Appleton, Wis., and a thin porous membrane of 10 micron thickness having an openness (porosity) of 15%, and an average pore size of 5 microns was loaded with a slurry of 70% hardwood and 30% soft wood fibers suspended in water. The consistency of the slurry was 0.3%. The slurry formed a wet web on the surface of the filtration medium. This combination of wet web and filtration medium was weighed and then placed in overlying relationship to a vacuum table through which a vacuum of 25 inches of Hg was applied to that surface of the filtration medium opposite the surface thereof which supported the web. After a period of 25 seconds, the vacuum was removed and the web and filtration medium was again weighed. From the difference in weight of the web and filtration medium before and after liquid withdrawal, the quantity of liquid withdrawn and the resulting consistency of the web was calculated. The dewatered web had a consistency of about 54%.

Like liquid withdrawal tests were performed with other combinations of filtration media and webs with similar desirable results. For example, employing the same operating conditions, but changing the porous membrane to a membrane having an average pore size of 3 microns produced a dewatered web having a consistency of about 51%, and a membrane having an average pore size of 1 micron produced a dewatered web having a consistency of about 49%. The 3-microns and 1-micron pore size membranes each has a porosity of 15%.

Whereas specific examples have been provided herein with respect to certain aspects of the invention, such examples are not deemed to be limiting other than as indicated in the claims appended hereto.

What is claimed:

1. A method for the removal of liquid from a porous web containing said liquid comprising the steps of
providing a filtration medium in position to receive thereon a porous web containing a liquid disposed within said pores of said web, said filtration medium including a first layer made up of a thin porous membrane having pores extending through the thickness thereof and a porous substrate layer supporting said membrane, said substrate including a plurality of reservoirs defined therein and which are in fluid communication with said pores in said membrane, said reservoirs having an average volume which is several times greater than the average volume of said pores through said membrane,
disposing said web on that surface of said filtration medium defined by said membrane in flat supported relationship thereon, to thereby establish fluid communication between said liquid in said web and the pores of said membrane,
selecting the size, number and/or distribution of said pores over the area of said membrane to be sufficient to effect capillary transfer of liquid from said web into said pores of said membrane but which will preclude the unaided reverse flow of liquid from said pores of said membrane to said web, irrespective of the period of time over which said liquid is present in said pores of said membrane and/or within said reservoirs defined in said substrate, providing a reduced pressure on that surface of said filtration medium opposite the surface thereof on which said web is supported to produce a pressure differential across the thickness of said web and said filtration medium, adjusting the value of said pressure differential across said web and filtration medium to a value which results in the removal of liquid from said reservoirs of said substrate as said liquid is transferred to said reservoirs from said pores of said membrane, collecting or disposing of said liquid which is withdrawn from said reservoirs.

2. The method of claim 1 wherein the size of said pores in said membrane layer of said filtration medium is established to be between about 0.04 and 10 microns in average diameter.

3. The method of claim 2 wherein the number of said pores through the thickness of said membrane is effective to establish a porosity of said membrane of between about 10% and about 30%.

4. The method of claim 1 wherein the pores through the thickness of said membrane are substantially straight-walled.

5. The method of claim 1 wherein the thickness of said membrane layer of said filtration medium is between about 5 and about 12 microns.

6. The method of claim 1 and including the step of disposing a further filtration medium on that side of said web opposite that filtration medium which supports said web to thereby capture said web between said media to form a layered composite, the substrate layer of each filtration medium being disposed adjacent one surface of said web.

7. The method of claim 6 and including the step of alternating the pressure differential across the thickness of said layered composite from one side thereof to the other side thereof.

8. The method of claim 1 and including the step of disposing a nonporous web on that surface of said web opposite said filtration medium.

9. The method of claim 1 and including the step of continuously moving said web and its supporting filtration medium forwardly through a zone of differential pressure across the thickness of said web and its supporting medium.

10. The method of claim 1 wherein the average diametral dimension of each of said pores through the thickness of said membrane is less than the smallest solid particulate that is desirably to be retained within said web during the removal of water from said web.

11. The method of claim 10 wherein the average diametral dimension of each of said pores through the thickness of said membrane is less than that diameter which will permit the energy stored in the liquid removed from said web and accumulated on that side of said membrane opposite said web to permit the liquid to reenter said pores and be available for reentry into said web.

* * * * *